United States Patent [19]

Dentzau

[11] Patent Number: 5,287,586
[45] Date of Patent: Feb. 22, 1994

[54] MATERIAL COLLECTING/REMOVAL APPARATUS

[75] Inventor: Thomas E. Dentzau, Springfield, Mass.

[73] Assignee: Waldorf Corporation, St. Paul, Minn.

[21] Appl. No.: 865,864

[22] Filed: Apr. 9, 1992

[51] Int. Cl.$^5$ .............................................. A47L 5/34
[52] U.S. Cl. ........................................ 15/303; 15/345; 406/90
[58] Field of Search .................. 15/303, 345, 346; 406/93, 86, 88, 89, 90

[56] References Cited

U.S. PATENT DOCUMENTS

| | | |
|---|---|---|
| 544,969 | 8/1895 | Dodge . |
| 1,842,416 | 1/1932 | Ludwig . |
| 1,844,635 | 2/1932 | Caller . |
| 2,758,041 | 8/1956 | Denning ............................ 15/345 X |
| 2,984,263 | 5/1961 | Loepsinger ........................ 15/345 X |
| 3,131,974 | 5/1964 | Futer . |
| 3,181,916 | 5/1965 | Epstein . |
| 3,775,806 | 12/1973 | Olbrant et al. .................... 15/345 X |
| 3,943,596 | 3/1976 | Wright et al. ......................... 15/301 |
| 4,049,321 | 9/1977 | Bunting .......................... 15/301 X |
| 4,504,177 | 3/1985 | Lagneau . |

*Primary Examiner*—Chris K. Moore
*Attorney, Agent, or Firm*—Dorsey & Whitney

[57] ABSTRACT

A waste collecting/removal apparatus having a bin with a forward waste outlet opening, a rearward air flow inlet, a plurality of adjustable inclined louvres spaced from the bottom of the bin and an air flow plenum below the louvres to cause air flow between the louvres to move the waste material in the bin upwardly and forwardly toward the outlet opening.

22 Claims, 2 Drawing Sheets

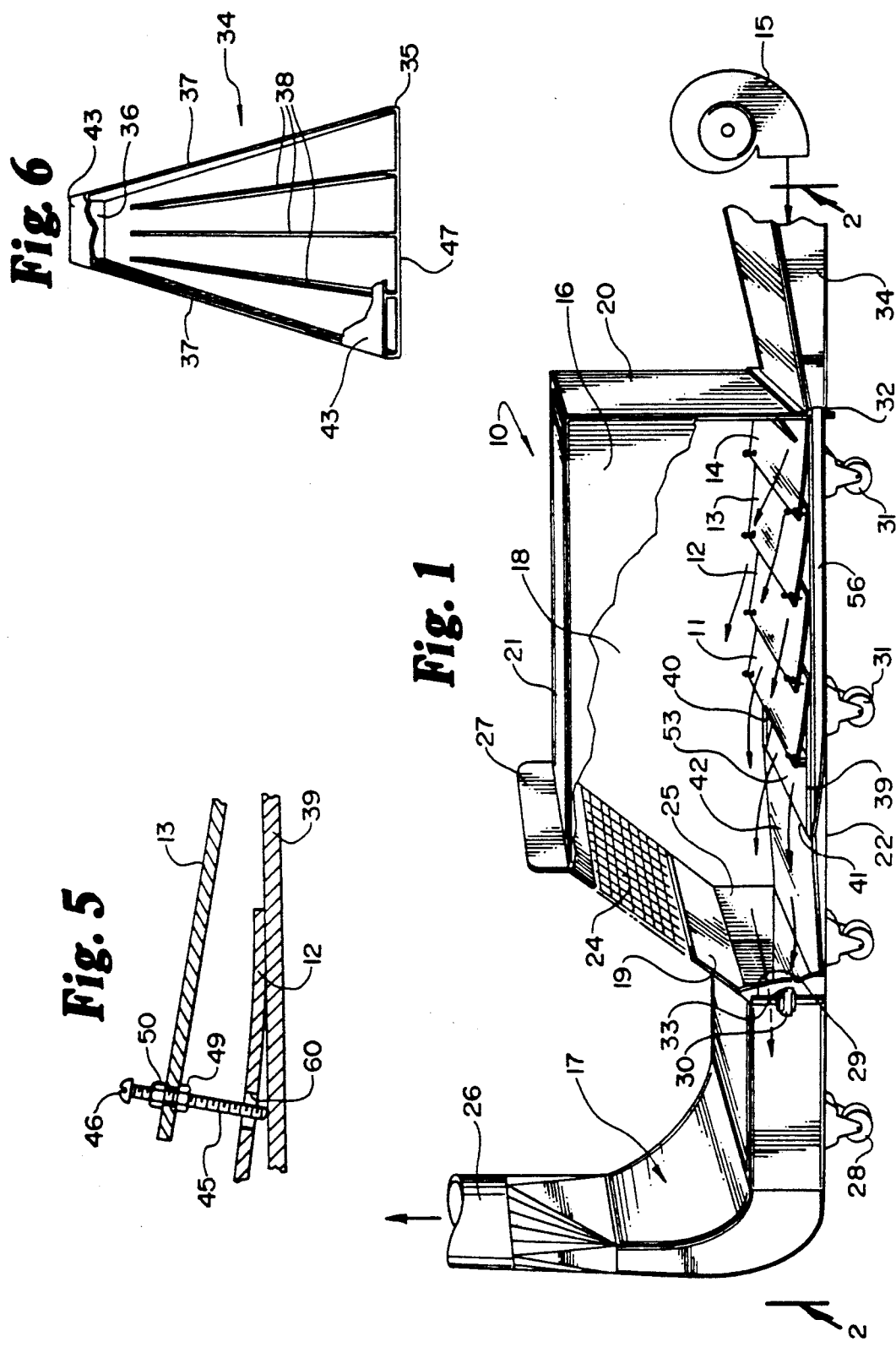

MATERIAL COLLECTING/REMOVAL APPARATUS

BACKGROUND OF THE INVENTION

1. Field of the Invention

The present invention relates generally to a material collecting/removal apparatus, and more particularly, to a portable waste or scrap collecting and removal apparatus for use in connection with a vacuum waste system.

2. Description of the Prior Art

The present invention has particular applicability to the collection and removal of waste or scrap materials in a paperboard carton manufacturing plant or in any other industry where generally light weight scrap or waste material is produced.

In a paperboard carton manufacturing plant, cartons for packaging and the like are die cut from a large sheet of paperboard or other carton material. Although attempts are made to minimize the amount of waste and scrap materials resulting from the die cut process, the generation of some waste or scrap is inevitable. In the past, this waste or scrap material was directed to a bin having a forwardly sloping floor which, during activation, would generally direct the scrap material toward a vacuum system connected to the forward end of the bin. These prior art bins are merely positioned below the die cutting machine to collect the waste or scrap material from the die cutting process. Then, periodically or whenever the bin was full, the vacuum system was activated. This removed much of the waste or scrap material which had been collected in the bin. However, despite the downward slope of the bin floor in these prior systems, clogging of the bin was quite common because of pieces of scrap or waste material getting hung up or wedged against a surface of the bin or against one another. This was particularly true with certain sizes, types and configurations of scrap material.

Accordingly, there is a need in the art for an improved waste and scrap collecting and removal apparatus which is adapted for use in connection with a waste vacuum system and which eliminates or substantially reduces the clogging of the waste and scrap material in the bin.

SUMMARY OF THE INVENTION

In contrast to the prior art, the present invention relates to a waste collecting/removal apparatus which is adapted for connection with a waste vacuum system and which functions to substantially reduce, if not eliminate, the tendency of waste or scrap material in the bin to become clogged during removal.

Specifically, the apparatus of the present invention comprises a bin having a closed bottom, an open top and front, rear and side walls. The front wall is provided with an opening for connection with a waste vacuum system, while the rearward end is provided with an opening for connection with an air flow source. The bin is provided with a plurality of upwardly sloped louvres which are spaced above the bottom wall to define an air flow plenum between the bottom surface of the louvres and the bottom of the bin. The forward end of each of the louvres cooperates with an adjacent louvre to form a forward air flow opening to direct an air flow against the waste and scrap material in the bin to lift such material upwardly and propel it forwardly toward the waste vacuum system. The vertical position of the forward end of each louvre is adjustable to define and control the direction of air flow through the forward openings. This enables the air flow to be adjusted to handle the specific size and type of material which has been deposited into the bin.

The general concept of providing a plurality of sheets or openings in combination with air flow to convey lightweight materials is not broadly novel. Examples include U.S. Pat. Nos. 544,969 issued to Dodge; 1,842,416 issued to Ludwig; 1,844,635 issued to Caller; 3,131,974 issued to Futer; 3,181,916 issued to Epstein and 4,504,177 issued to Lagneau. However, these patents fail to disclose features which are needed for application of the present invention to the collection and removal of waste or scrap materials in a paperboard carton manufacturing plant or the like. Further, the above patents fail to disclose the adjustability of the sheets or openings to control the air flow.

In the preferred embodiment of the present invention, the forward end of the bin is provided with a mesh opening to provide visual access to the interior of the bin and to also assist in balancing the air flow between the waste vacuum system and the air flow source. The bin is also mounted on a plurality of wheels or casters to facilitate the portability of the apparatus and a clean out door is provided in the outside bottom panel of the plenum area.

Accordingly, it is an object of the present invention to provide a waste collecting/removal apparatus which substantially reduces, if not eliminates, clogging within the bin.

Another object of the present invention is to provide an improved, waste collecting/removal apparatus which is adapted for connection to a vacuum waste system at its front end and an air flow source at its rearward end and includes means utilizing the air flow to convey waste and scrap material from the rearward portion of the bin to the vacuum waste system.

A further object of the present invention is to provide an improved apparatus for conveying materials having a bin with a plurality of adjustable air flow louvres near the bottom to lift and propel such materials toward the front end of the bin.

A still further object of the present invention is to provide an improved waste collecting/removal apparatus which is portable and is provided with a quick connect/disconnect means for connection to and disconnection from a waste vacuum system.

A still further object of the present invention is to provide a waste collecting/removal system having particular applicability in connection with the collection and removal of waste or scrap material in a paperboard carton manufacturing plant or the like.

These and other objects of the present invention will become apparent with reference to the drawings, the description of the preferred embodiment and the appended claims.

DESCRIPTION OF THE DRAWINGS

FIG. 1 is a perspective view of the waste collecting/removal apparatus of the present invention connected with a waste vacuum system and an air flow source, with a portion of the left side wall broken away.

FIG. 5 is a structure similar to FIG. 4 showing an alternate application of the adjustment mechanism.

FIG. 6 is a view of the interior of the baffle mechanism between the apparatus of the present invention and the air flow source, with the top wall removed.

DESCRIPTION OF THE PREFERRED EMBODIMENT

Figure 4:
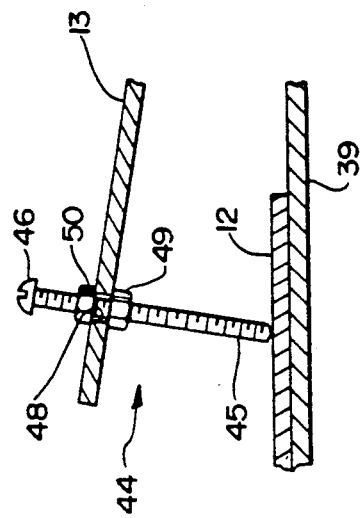
FIG. 4 is an exploded view of the mechanism for adjusting the louvres.

In the description of the preferred embodiment, the invention is described as a waste collecting/removal apparatus. While this is its principal application, it is contemplated that some of the features may have broader applicability. For example, the adjustability of the air flow louvres may have applicability in the air flow conveying field per se for controlling the conveying air flow to match the particular size and type of material being conveyed. Accordingly, it is not intended that the scope of the present invention be limited by the description of the preferred embodiment. Further, throughout the description, the terms "waste" and "scrap" are used. These terms are intended to be interchangeable.

With general reference to FIG. 1, the waste collecting/removal apparatus of the present invention is shown as including a waste or scrap collection bin 10, means in the form of a plurality of air flow louvres 11, 12, 13 and 14 for lifting and propelling waste and scrap material toward the front of the bin 10, a waste vacuum system 17 adapted for connection with a forward end of the bin 10 and an air flow source 15 adapted for connection with the rearward end of the bin 10. The bin 10 includes a pair of generally parallel side walls or panels 16 and 18, a front wall or panel 19, a rear wall or panel 20 generally parallel to the front wall 19, an open top 21 and a bottom 22. The side walls, front and rear walls and bottom are joined to one another as shown to define the bin 10 with a generally open top. Although the preferred embodiment shows the bin 10 with a fully open top 21, it is contemplated that the top may be partially closed or selectively fully closed with a door or lid panel. The preferred embodiment also contemplates the bin 10 being constructed from 11 gauge steel; however, other materials and other steel thickness could be used as well.

The front wall or panel 19 is provided with a mesh opening 24 over a substantial portion of its surface for providing visual access to the interior of the bin 10 and for balancing the air flow between the waste vacuum system 17 and the air source 10 as will be described in greater detail below. The top portion of the front panel 19 which includes the mesh 24 is inclined forwardly and downwardly. A positioning flange 27 extending upwardly from the top edge of the front panel serves as a stop member for properly positioning the bin 10 relative to the die cutting machine. The bottom portion of the front panel 19 adjacent to the bottom panel 22 is provided with a front opening 25 for communication with an inlet to the waste vacuum system 14.

The waste vacuum system of the present invention is an Ohio blowpipe vacuum system which includes a conduit portion 26 for conveying the waste and scrap materials to a desired location and an inlet end 29 for registration with the front opening 25 of the bin 10. The vacuum system also includes means (not shown) for creating a vacuum or exhaust air flow in the conduit 26 and at the inlet 29. Quick attachment/detachment means are provided to selectively and releasably connect the waste vacuum system 17 to the forward end of the bin 10. Specifically, this quick release mechanism in the preferred embodiment comprises the releasable clamp member 30 mounted to the waste vacuum system 17 adjacent to the inlet 29. A portion of the clamp 30 is adapted for connection with a connection bracket 33 on each of the side walls 16 and 18. In the preferred embodiment, the waste vacuum system 17 is mounted on casters 28, while the bin 10 is mounted on a plurality of casters 31.

The rear wall 20 of the bin 10 is provided with a rearward opening 32 adjacent to the bottom panel 22. The opening 32 is adapted for connection with the air flow source 15 via an air flow baffle 34. As illustrated best in FIG. 6, the baffle 34 includes a forward end 35 for registration with the rearward opening 32 (FIG. 1), a rearward end 36 for connection with the air flow source 15 and a pair of side walls 37, a top wall 43 and a bottom wall 47 extending between the forward and rearward ends 35 and 36. The interior of the baffle 34 is provided with a plurality of laterally spaced and vertically extending baffle plates 38 which extend from the forward end 35 rearwardly to a point spaced forwardly of the rearward end 36. The function of the baffle plates 38 is to assist in distributing the air flow from the air flow source 15 to the rearward opening 32 and thus the interior of the bin 10. It should be noted that the individual baffle plates 38 can be equally spaced from one another or can be variably spaced so as to provide variable air flow to certain portions of the rearward opening 32.

Figure 3:
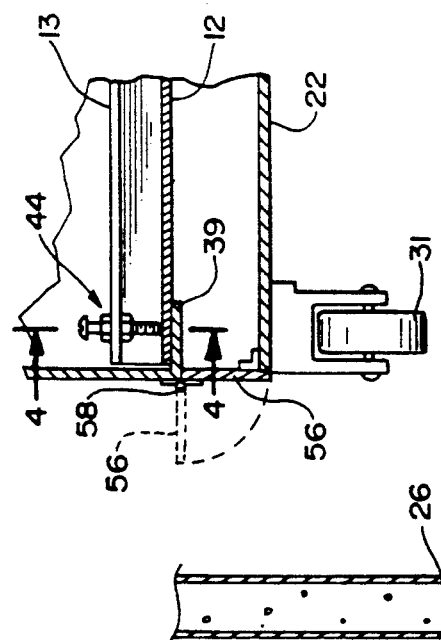
FIG. 3 is a view, partially in section, as viewed along the section line 3—3 of FIG. 2.
Figure 2:
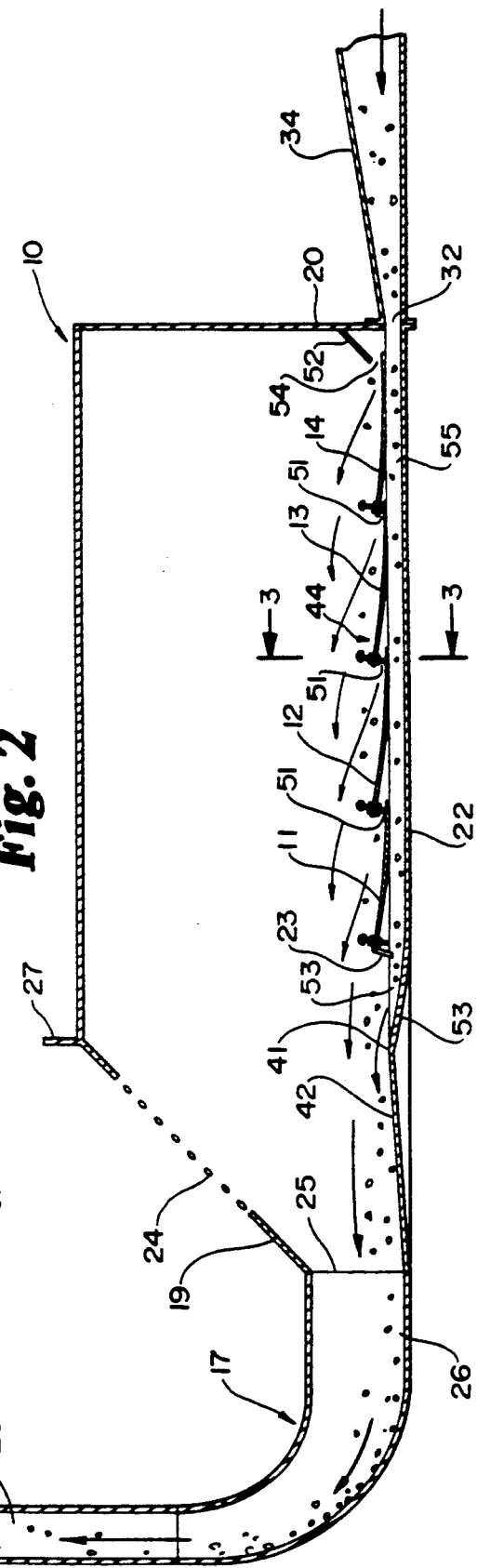
FIG. 2 is a view, partially in section, as viewed along the section line 2—2 of FIG. 1.

The interior of the bin, and in particular, the structure of the plurality of louvres 11, 12, 13 and 14 is illustrated best in FIGS. 2 and 3. As shown, the bottom panel 22 of the bin 10 extends from the rearward opening 32 to the forward opening 25. Spaced above the bottom 22 and positioned on opposite sides of the bin are a pair of side support rails 39 and 40. The rails 39 and 40 extend from the rearward wall 20 forwardly and generally parallel to the bottom 22 for a substantial length of the bin to the point 41 where the rails 39 and 40 meet the inclined floor panel 42. The inclined floor 42 slopes downwardly from the forward ends of the rails 39 and 40 toward the opening 25. A forward plenum wall 53 is provided between the bottom 22 and the rearward end of the inclined panel 42. The wall 53 slopes generally upwardly and forwardly as shown to direct air flow from the interior of the bin 10 as will be described in greater detail below.

The rails 39 and 40 support a plurality of adjustable, airflow louvres 11, 12, 13 and 14 which extend across the entire width of the bin 10. Each of the louvres 11, 12, 13, and 14 includes a rearward end which is secured to the rails by welding or the like and a free or cantilevered forward end. Each of the louvres 11, 12 and 13 is provided with an adjustment means 44 for adjusting the vertical position of the forward end of the louvres relative to the support rails 39 and 40. With the adjustment means 44, the angle of inclination of the louvres 11, 12 and 13 can be adjusted to alter and control the characteristics of the air flow between the louvres.

As illustrated best in FIGS. 1 and 2, each of the louvres is comprised of a relatively flat, rectangular panel positioned between the side walls 16 and 18 of the bin. In the preferred embodiment, the louvres are constructed of 14 gauge steel. It is contemplated, however, that other materials and thicknesses can be used. The type and thickness of the louvres 11, 12, 13 and 14 should be selected to accommodate the particular waste or scrap material in the bin since the louvres in the structure of the present invention are load bearing. It is also contemplated that one or more additional support rails could be positioned between and parallel to the rails 39 and 40 to assist in supporting the louvres if such additional support is needed or desired.

As further illustrated best in FIGS. 1 and 2, the forward ends of each of the louvres 12, 13 and 14 extend forwardly past the rearward end of the forwardly adjacent louvre. Specifically, the forward end of the louvre 14 extends over a portion of the louvre 13, a portion of the louvre 13 extends over a portion of the louvre 12, and the forward end of the louvre 12 extends over a portion of the louvre 11. The forward end of the forwardmost louvre 11 extends to a point rearwardly of the rearward end of the floor panel 42 defined by the point 41. The louvre 11 is provided with a front plate 23 which extends downwardly from the front edge of the louvre 11 to define the air flow opening 53.

The means 44 for adjusting the incline of the louvres 11, 12, 13 and 14 is shown in detail in FIG. 4 illustrating the adjustment means associated with the louvre 13. Such means 44 includes an elongated threaded member 45 with a screw top 46. The member 45 extends through an opening 48 near the forward end and on each side of the louvres. A threaded nut or other member 49 is secured to the bottom of each louvre in the vicinity of the hole 48 to receive the threaded member 45. A lock nut 50 is provided on the opposite side of the louvre and is threadedly received by the threaded member 45. The threaded nuts 49 and 50 can be on opposite sides of the louvre as shown, or can be on the same side. Further, the nut 49 can be secured to the top of the louvre with the lock nut 50 below the louvre. Still further, depending on the thickness of the louvres and various other factors, threads can be provided in the opening 48 for receiving the member 45, thereby eliminating the need for the nut 49.

Each of the louvres 11, 12, 13, and 14 is a generally flat plate or panel which, when secured to the side support rails 39 and 40 at its rearward end by welding or the like, tends to lie flat on the rails 39 and 40 with the forward end of one louvre lying above and in contact with the rearward portion of an adjacent forward louvre. To open the louvres to provide an air flow opening between them, the adjustment means 44 are adjusted by rotating the threaded member 45 in a clockwise direction. This causes the member 45 to threadedly advance through the nut 49 with the lower end of the member 45 bearing against a top portion of the rearward end of an adjacent louvre (in the case of louvres 12, 13 and 14) or the top surface of the rails 39 and 40 (in the case of the louvre 11). By controlling the amount of rotation of the threaded member 45, the air flow opening between adjacent louvres can be adjusted. As shown in FIG. 2, the air flow openings controlled by the louvres 12, 13 and 14 are designated by reference numeral 51, while the air flow opening controlled by the louvre 11 is designated by the reference numeral 53.

As shown in FIG. 5, it is also contemplated that appropriately positioned openings 60 could be provided in the lower louvre to receive the threaded member 45. This would be of particular benefit if it was desired for the top louvre to extend forwardly past the rearward end of the lower louvre as shown in FIG. 5.

A rear louvre 52 is provided at the rearward portion of the bin. The rear louvre 52 is a generally rectangular member constructed of 14 gauge steel with its rearward edge and side edges secured to the rear wall 20 and side walls 16 and 18, respectively, by welding or the like. The forward edge of the rear louvre 52 extends forwardly and downwardly to a point where it overlaps at least a portion of the louvre 14. The rear louvre 52 is inclined forwardly and downwardly as shown to prevent buildup of waste and scrap material at the rearward end of the bin 10. The forward edge of the rear louvre 52 is spaced above the rearward portion of the louvre 14 to provide an appropriate air flow opening 54.

The plurality of louvres 11, 12, 13 and 14 and the rear louvre 52 together with the bottom 22 and the wall 53 define an air flow plenum 55 which receives a source of air flow from the fan 15 (FIG. 1) and directs it through the openings 51, 53 and 54 into the interior of the bin 10 to propel and move the material in the bin upwardly and forwardly toward the front opening 25.

As illustrated best in FIG. 3, the lower portion of one side of the bin 10 in the area of the plenum 55 is provided with a cleanout door 56 which is hinged to a portion of the bin frame at the point 58. The cleanout door 56 extends the entire length of the plenum and is provided with appropriate latch means for selectively latching and unlatching the door for purposes of periodically cleaning out the plenum 55.

Having described the structure of the present invention, the operation can be understood as follows. During a die cutting operation, the bin 10 is positioned beneath a die cutting machine. Waste and scrap materials from the die cutting process are directed into the bin through the open top. When the bin is filled with waste or scrap materials, or when it is desired that the bin be emptied, the fan 15 and waste system 17 are activated. The vacuum system functions to pull scrap and waste material in the bin through the forward opening 25 and into the conduit 26. The fan 15 causes an air flow through the baffle means 34 into the rearward opening 32 and into the plenum 55. The air flow in the plenum is then directed outwardly through the openings 51, 53 and 54 to propel the waste and scrap material upwardly and forwardly toward the front end of the bin 10 where it can be reached by the vacuum force of the system 17. The forward surface 42 is inclined downwardly and forwardly toward the opening 25 to assist in removal of all waste and scrap materials from the bin 10.

Although the description of the preferred embodiment has been quite specific, it is contemplated that various modifications could be made without deviating from the present invention. Accordingly, it is intended that the scope of the present invention be dictated by the appended claims rather than by the description of the preferred embodiment.

I claim:

1. A waste collecting/removal apparatus for connection with a vacuum waste system and an air flow source, said apparatus comprising:

a bin having a closed bottom, an at least partially open top, a pair of sides joining said top and bottom and a front end and a rearward end joined with said sides;

a front opening at said front end for connection with a vacuum waste system;

a rearward opening at said rearward end for connection with an air flow source;

a plurality of adjustable air flow louvres extending across said bin, each of said louvres having a rearward end fixed to said bin and spaced above said bottom and a forward end being vertically adjustable, each of said louvres being inclined forwardly and upwardly relative to said bin bottom;

adjustment means associated with each of said louvres for adjusting the vertical position of the forward end thereof; and an air flow plenum in communication with said rearward opening and positioned below said plurality of louvres.

2. The apparatus of claim 1 wherein said plurality of louvres are adjacent to one another and wherein the forward end of one louvre overlaps a portion of the rearward end of a forwardly adjacent louvre.

3. The apparatus of claim 2 wherein said plurality of louvres includes at least one pair of adjacent louvres comprising a rearward louvre and a forward louvre.

4. The apparatus of claim 3 wherein said adjustment means includes a threaded member threadedly received by one of said forward and rearward louvres.

5. The apparatus of claim 4 wherein said threaded member is received by said rearward louvre near its forward end and the forward end of said rearward louvre overlaps a portion of the rearward end of said forward louvre.

6. The apparatus of claim 1 including a baffle means connected between said rearward opening and said air flow source for distributing air flow to said plenum, said baffle means comprising at least one vertically disposed baffle plate.

7. The apparatus of claim 1 including quick connect/disconnect means for selectively and releasably connecting said front opening to said vacuum system.

8. The apparatus of claim 1 wherein each of said louvres includes a free end.

9. The apparatus of claim 1 including a forwardly and downwardly inclined floor panel rearwardly adjacent to said front panel.

10. The apparatus of claim 9 wherein the rearward end of said inclined floor panel is spaced forwardly of the forwardmost louvre.

11. The apparatus of claim 1 including a forwardly and downwardly inclined rear louvre having a rearward end connected to the rearward end of said bin and a forward end overlapping a portion of a forwardly adjacent louvre.

12. A waste collecting/removal apparatus for connection with a vacuum waste system and an air flow source, said apparatus comprising:

a bin having a closed bottom, an at least partially open top, a pair of sides joining said top and bottom and a front end and a rearward end joined with said sides;

a front opening at said front end for connection with a vacuum waste system;

a rearward opening at said rearward end for connection with an air flow source;

a plurality of adjustable air flow louvres extending across said bin, each of said louvres having a rearward end fixed to said bin and spaced above said bottom and a forward end being vertically adjustable;

an air flow plenum in communication with said rearward opening and positioned below said plurality of louvres; and a cleanout door for said plenum.

13. The apparatus of claim 1 wherein said front end includes a meshed opening.

14. The apparatus of claim 1 wherein the forwardmost louvre includes a downwardly extending plate at its forward end to define an air flow opening.

15. The apparatus of claim 14 wherein said plurality of louvres are adjacent to one another and wherein the forward end of one louvre overlaps a portion of the rearward end of a forwardly adjacent louvre.

16. An apparatus for conveying materials comprising:
a vacuum system;
an air flow source;
a conveying bin having a closed bottom, a front end, a rearward end and sides, said bin having a front opening at its front end for connection with said vacuum system and a rearward opening at its rearward end for connection with said air flow source;
a plurality of adjustable air flow louvres extending across said bin, each of said louvres having a rearward end fixed to said bin and spaced above said bottom and a forward end being vertically adjustable;

adjustment means associated with each of said louvres for adjusting the vertical position of the forward end thereof; and an air flow plenum in communication with said rearward opening and positioned below said plurality of louvres.

17. The apparatus of claim 16 wherein said plurality of louvres includes at least one pair of adjacent louvres comprising a rearward louvre and a forward louvre.

18. The apparatus of claim 1 being an apparatus for collecting and removing paperboard manufacturing scraps.

19. The apparatus of claim 1 wherein the rearward end of each of said plurality of louvres is fixed to a support rail.

20. The apparatus of claim 19 wherein the rearward end of each of said plurality of louvres is fixed to a common support rail.

21. The apparatus of claim 1 wherein each of said louvres includes a pair of opposed side edges which are free of connection to any supporting structure along a substantial portion of said side edges.

22. The apparatus of claim 16 wherein each of said louvres includes a pair of opposed side edges which are free of connection to any supporting structure along a substantial portion of said side edges.

* * * * *